United States Patent [19]

Lotze et al.

[11] Patent Number: 5,560,664
[45] Date of Patent: Oct. 1, 1996

[54] DEVICE FOR COUPLING A CABLE OF A LIFTING DEVICE TO A PREFABRICATED COMPONENT

[75] Inventors: Dieter Lotze, Maulbronn; Klaus Fröhlich, Pforzheim, both of Germany

[73] Assignee: Halfen GmbH & Co. Kommanditgesellschaft, Düsseldorf, Germany

[21] Appl. No.: 225,720

[22] Filed: Apr. 8, 1994

[30] Foreign Application Priority Data

Apr. 8, 1993 [DE] Germany .................... 43 11 757.0

[51] Int. Cl.$^6$ .................................................. B66C 1/66
[52] U.S. Cl. .................................... 294/89; 294/1.1
[58] Field of Search .................. 294/1.1, 67.4, 294/68.3, 74, 82.1, 82.11, 89; 24/265 R, 265 CD; 52/125.2, 125.4, 125.5; 248/499; 410/85, 101, 112–114

[56] References Cited

U.S. PATENT DOCUMENTS

| | | | |
|---|---|---|---|
| 3,297,293 | 1/1967 | Andrews et al. | 294/1.1 X |
| 3,371,951 | 3/1968 | Bryant | 294/1.1 |
| 3,492,033 | 1/1970 | Mueller | 294/1.1 X |
| 3,628,820 | 12/1971 | Blatt | 294/1.1 |
| 3,905,633 | 9/1975 | Larson | 294/1.1 |
| 4,735,450 | 4/1988 | Fern | 294/89 |
| 5,125,861 | 6/1992 | Freeman | 294/1.1 X |
| 5,286,130 | 2/1994 | Mueller | 294/1.1 X |

FOREIGN PATENT DOCUMENTS

| | | | |
|---|---|---|---|
| 121767 | 10/1984 | European Pat. Off. | 294/89 |
| 0161652 | 11/1985 | European Pat. Off. | |
| 2411999 | 9/1975 | United Kingdom | 294/89 |
| 2040872 | 9/1980 | United Kingdom | 294/68.3 |

*Primary Examiner*—Johnny D. Cherry
*Attorney, Agent, or Firm*—Robert W. Becker & Associates

[57] ABSTRACT

A coupling device for coupling a cable of a lifting device to a prefabricated component has a receiving member for receiving the cable and a fastener for connecting the receiving member to the prefabricated component such that the receiving member is rotatably supported at the prefabricated component. The receiving member is embodied so as to rest at the surface of the prefabricated component. The receiving member has a cable guide portion for guiding the cable. The cable guide portion extends substantially parallel to the surface of the prefabricated component and is located directly adjacent to that surface. Preferably, the receiving member is in the form of a plate and the cable guide portion is arc-shaped.

13 Claims, 4 Drawing Sheets

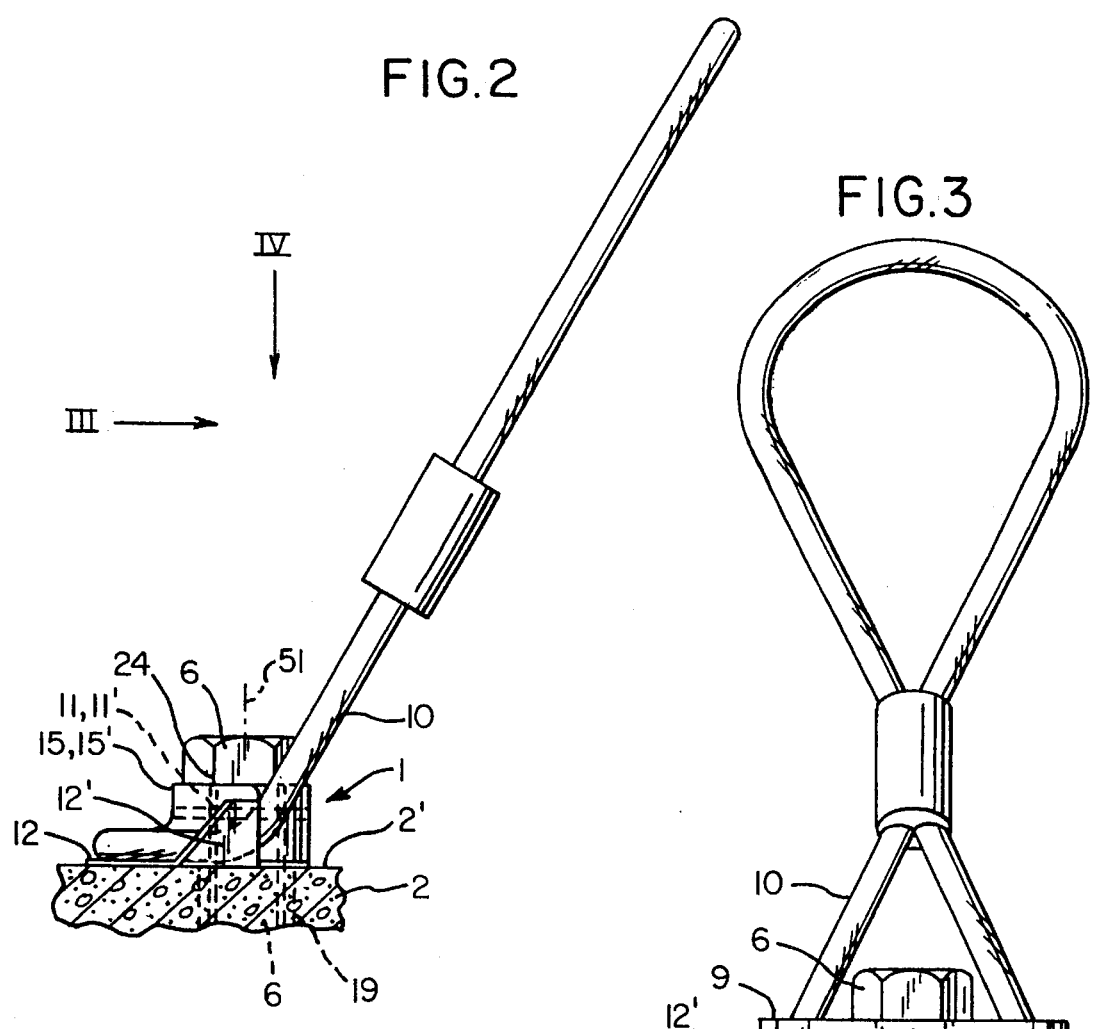

5,560,664

DEVICE FOR COUPLING A CABLE OF A LIFTING DEVICE TO A PREFABRICATED COMPONENT

BACKGROUND OF THE INVENTION

The present invention relates to a device for coupling a cable of a lifting device to a prefabricated component to be lifted or to be transported, especially to a precast concrete component, the device comprising a receiving member for the cable that is supported at the surface of the prefabricated component with a fastener in a rotatable manner.

A known device of the aforementioned kind is described in European document 0 161 652 and is comprised of an ring screw that is screwed into the prefabricated (precast) concrete component and has an annular element that is rotatable relative to the threaded bolt screwed into the prefabricated concrete component. At the outer end of the threaded bolt a securing member is provided that supports the annular element. Due to its rotatability the annular element is adaptable to pulling action at a slant exerted by the pulling or lifting device without the threaded bolt being rotated within the precast component. This substantially prevents overloading by angular pulling forces. The threaded bolt which is fixedly connected within the precast concrete component acts as a pulling anchor and is screwed into a sleeve cast into the component and above which a support plate is provided which is a unitary part of the threaded bolt. The ring screw which is rotatable about 360° has a transverse opening above the threaded bolt which is engaged by a part of the lifting device, for example, an intermediate member in the form of a massive ring or a cable loop.

It is disadvantageous in this design that the point of action of the lifting forces when exerted at an angle is positioned at a relatively great distance from the surface of the precast component to be moved so that the forces acting at an angle exert considerable bending forces on parts of the device, for example, on the ring screw, the threaded bolt, and the threaded sleeve which upon transverse load may even result in breakage of the threaded sleeve or of the fastener. The known device therefore must be dimensioned correspondingly larger (stronger) for reasons of safety. Furthermore, it is disadvantageous that the oval annular element, embodied in the form of a handle, is subjected, due to its oval receiving opening which, relative to the precast component surface, is positioned relatively high above the component surface for receiving the intermediate member or the cable loop, to pulling, bending, and transverse forces depending on the point of action of the lifting force so that this component must also be dimensioned relatively large (strong).

It is therefore an object of the present invention to provide a device of the aforementioned kind with which the disadvantages of the known device can be avoided, in which the loading with respect to bending especially of the pulling anchor which is screwed into the threaded sleeve cast into the component is reduced in an optimal manner when slanted or transverse pulling forces are generated, and which is designed such that during lifting of the load the forces have the smallest possible distance to the surface of the component to be lifted, whereby it is also desired to avoid a single point of action of the lifting force in the pulling direction at the device.

BRIEF DESCRIPTION OF THE DRAWINGS

This object, and other objects and advantages of the present invention, will appear more clearly from the following specification in conjunction with the accompanying drawings, in which:

FIG. 2 is a side view, partially in section, of the device according to FIG. 1 fastened with a fastener to the surface of a concrete component;

FIG. 3 shows the same arrangement in a view in the direction of arrows III;

FIG. 4 shows a plan view of the arrangement of the device according to FIG. 2;

SUMMARY OF THE INVENTION

Figure 1:
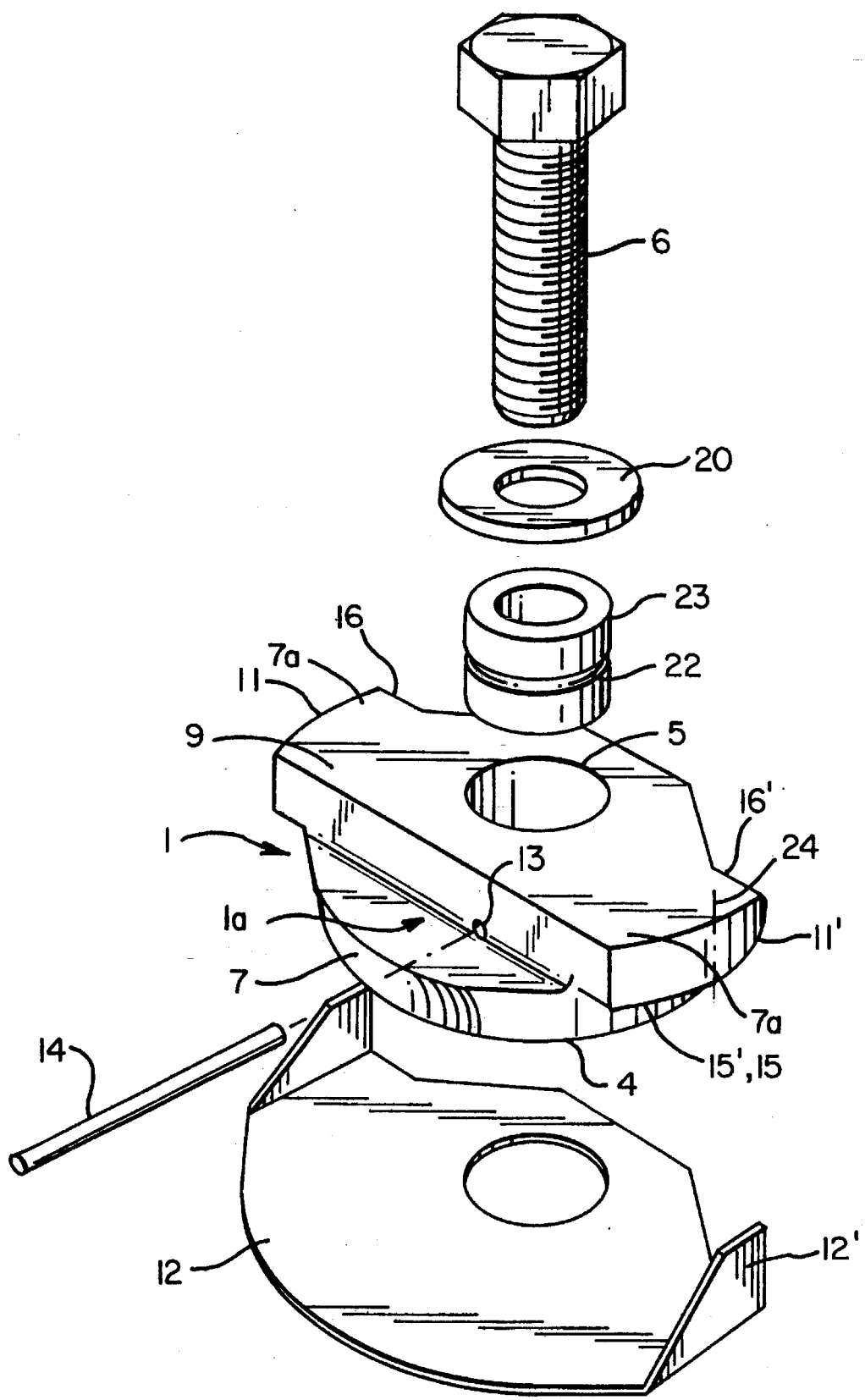
FIG. 1 is an exploded view of an embodiment of the inventive device.

The coupling device for coupling a cable of a lifting device to a prefabricated component according to the present invention is primarily characterized by:

A receiving member for receiving the cable;

A fastener for connecting the receiving member to the prefabricated component such that the receiving member is rotatably supported at the prefabricated component;

The receiving member is embodied so as to rest at a surface of the prefabricated component; and The receiving member has a cable guide portion for guiding the cable, the cable guide portion extending substantially parallel to the surface of the prefabricated component and directly adjacent to the surface of the prefabricated component.

Advantageously, the receiving member comprises a plate and the cable guide portion is arc-shaped.

Expediently, the plate has a planar base surface and a throughbore extending perpendicular to the base surface through the receiving member, the throughbore receiving the fastener.

Preferably, the plate is selected from the group consisting of a semi-circular plate and a semi-oval plate. The cable guide portion is preferably located at the periphery of the plate such that the throughbore is centrally positioned relative to the cable guide portion. Advantageously, the cable guide portion extends substantially over an angular distance of 180°.

Preferably, the coupling device further comprises means for deflecting the cable from a direction parallel to the surface of the prefabricated component in an upward direction relative to the surface of the prefabricated component in which upward direction pulling forces are exerted by the lifting device.

Advantageously, the cable guide portion has end sections and the means for deflecting are located at the end sections of the cable guide portion. The means for deflecting are in the form of upwardly extending deflecting surfaces that are arranged such that the cable is guided upwardly in a direction toward the lifting device.

Preferably, the receiving member comprises a stay positioned on a side of the plate opposite the base surface. The deflecting surfaces are provided at free ends of the stay.

Advantageously, the plate and the stay are a unitary part. The stay preferably projects upwardly past the end sections of the cable guide portion. The free ends of the stay have an underside to which the deflecting surfaces are connected. Preferably, the undersides of the free ends also have limiting surfaces for securing the guiding of the cable, wherein the limiting surfaces are positioned on a side of the deflecting surfaces facing the cable guide portion.

In a preferred embodiment of the present invention, the deflecting surfaces have a center that is displaced toward the cable guide portion relative to a line extending through the center of the throughbore and the end sections of the cable guide portion.

Advantageously, the deflecting surfaces have edges extending parallel to a diameter delimiting a semi-circle of the cable guide portion.

Preferably, the cable guide portion is a tunnel-shaped recess of the plate wherein the recess is dimensioned so as to enclose the cable without play.

Preferably, the tunnel-shaped recess extends to the base surface and ends in a support surface extending in the same plane as the base surface.

In a preferred embodiment of the present invention, the coupling device further comprises a thin-walled cover plate connected to the plate so as to be positioned between the base surface and the surface of the prefabricated component.

Advantageously, the coupling device further comprises a threaded sleeve connected within the prefabricated component for receiving the fastener.

Preferably, the plate has an auxiliary bore positioned at an angle to the throughbore for receiving a securing pin. Advantageously, the fastener comprises at least one adapter for adapting the diameter of the fastener to the diameter of the threaded sleeve. The adapter has an annular recess for receiving the securing pin.

In a preferred embodiment of the present invention, one threaded sleeve is used in combination with a plurality of fasteners whereby each fastener has a different diameter. The fasteners are then adapted to the threaded sleeve with the adapters.

According to the present invention, the receiving member for the lifting cable or an intermediate member of the lifting device, i.e., the receiving member acting as a cable guide, due to being supported rotatably by the fastener can be rotated in a manner known per se about 360° and can thus be adjusted to the corresponding pulling direction. However, since the receiving member with the cable guide, for example, is embodied with a planar base surface such that it rests directly on the surface of the load, i.e., on the surface of the prefabricated component, and the lifting cable is guided about an arc-shaped, preferably circular, section of 180° substantially parallel and in direct vicinity to the surface of the prefabricated component, especially for lifting forces that are exerted parallel or at a small angle relative to the surface of the prefabricated component, the pulling anchor (fastener) and the threaded sleeve are loaded only to a minimal extent with bending forces whereby the load capacity of the sleeve and the device in itself is substantially improved.

When according to a further embodiment of the invention the receiving member is, for example, embodied as a disk-shaped plate in which a portion of its periphery, preferably a portion of 180°, is embodied as a cable guide portion such that the cable is guided within this portion, a sufficiently great support surface of the device at the surface of the prefabricated component results so that bending moments that are present may be transmitted into the prefabricated component via the threaded sleeve, the fastener (pulling anchor), and the support action at the prefabricated surface. The receiving member may also be embodied as a semi-oval plate or a similar shape with a portion for guiding the cable or in any other similar shape. The bending residance load of the threaded sleeve and of the pulling anchor therefore must not be fully exhausted.

Advantageously, the cable guide portion of an angular extension of essentially 180° is provided at the periphery of the plate and is arranged centrally to a throughbore provided in the plate for receiving the pulling anchor (fastener). With this arrangement, the cable can be guided in direct vicinity of the surface of the prefabricated component in a preferably semi-circular arc about the periphery of the plate, wherein the plate in itself may be embodied substantially semi-circular. Such a guiding of the cable at the end face of the receiving member in the form of a plate allows for a smallest possible distance between the cable and the surface of the prefabricated component. Furthermore, the receiving plate or receiving member may be embodied with a relative low height because it is loaded only by greatly reduced pulling and bending forces.

A very advantageous further embodiment results when the plate-shaped receiving member with its portion for guiding the cable is furthermore provided with means for deflecting the cable from a direction parallel to the surface of the prefabricated component into an upwardly oriented outwardly extending pulling direction. For this purpose, it is advantageous to provide at the plate-shaped receiving member at both end sections of the cable guide portion respective deflecting surfaces. With these deflecting surfaces the cable which is guided substantially parallel and at a minimal distance to the surface of the prefabricated component is deflected in a direction toward the lifting device, i.e., upwardly. These upwardly extending deflecting surfaces in a simple embodiment of the inventive device are provided at the free ends of a stay which is preferably connected substantially diagonal to the cable guide section and which is positioned above the plate and is embodied as a unitary part of the plate. This ensures a flawless guiding of the cable, especially during an upwardly directed lifting action in which the cable with the exception of the horizontal guiding about the plate due to the predetermined exactly defined deflecting surfaces is upwardly guided at a predetermined arc without the risk of producing a bending action that is too great or a folding of the cable. Advantageously, these deflecting surfaces are formed by the free ends of the stay which project on both sides past the end sections of the cable guide portion such that a flawless and complete contact of the cable within the area of these deflecting locations is provided.

DESCRIPTION OF PREFERRED EMBODIMENTS

The present invention will now be described in detail with the aid of several specific embodiments utilizing FIGS. 1 through 12.

The exploded view according to FIG. 1 shows the device for coupling a cable of a lifting device in a complete representation with the fastener 6 (pulling anchor or tension rod) in the form of a threaded bolt, which is screwed into a threaded sleeve 19 (FIGS. 2 and 3) that is cast into the prefabricated component 2.

The pulling anchor (tension rod) 6 penetrates a bore 5 of the receiving member 1 for guiding the cable. This receiving member 1 is, as can be seen in FIGS. 1 to 10, in the shape of a plate 1a which is essentially disc-shaped. As can be seen in FIG. 1, between the receiving member 1 and the pulling anchor 6 intermediate rings 20 (washers) and/or adapters 23 can be provided, if needed, for adapting different sizes of pulling anchors 6 to the threaded sleeve 19. Accordingly, for different load conditions the respectively required pulling anchor 6 can be adapted to one and the same size of the threaded sleeve 19 cast into the precast component, as can be seen in FIGS. 12a–d with four differently sized pulling anchors.

In FIG. 1 a cover plate 12 is shown for covering the planar base surface 4 of the plate 7a which cover plate 12 is also penetrated by the pulling anchor 6.

The receiving member 1 which in the simplest manner is provided as a plate is supported at the surface 2' of the precast or prefabricated component 2 and connected thereto with the pulling anchor 6 so as to be rotatable about 360° such that the receiving member 1 can be adjusted to any pulling direction of the cable 10.

According to the invention the receiving member 1 comprised of a plate 1a and a stay 9 is embodied so as to rest on the surface 2' of the prefabricated component 2. The plate 7a of the receiving member 1, at its periphery, is provided with a cable guide portion 7 in which the cable 10 rests and with which it is guided substantially parallel and directly adjacent, respectively, directly above the surface 2' of the prefabricated component 2. For this purpose, the base surface 4 of the plate 1a of the receiving member 1 is a planar surface which in the mounted state is positioned, with interposition of the cover plate 12, at the surface 2' of the prefabricated component 2 and extends parallel to this surface 2'. Perpendicular to this planar base surface 4 a throughbore 5 is provided that penetrates the plate 1a and the stay 9 and receives the pulling anchor 6.

The cable guide portion 7 is centrally arranged about the throughbore 5 at the periphery of the plate 1a whereby the portion 7 extends about an angle of 180°. About this portion 7 the cable 10 is guided. Accordingly, the cable 10 rests at the end face of the disc-shaped plate 1 in the mounted state as can be seen in FIGS. 2 to 4.

In order to maintain a secure guiding of the cable 10 in this area, the cable guide portion 7 may be provided with a concave contact surface for the cable 10. The cover plate 12 is provided with perpendicularly extending lateral guide surfaces 12' which may extend toward the forward area of the cable guide portion 7 in order to securely hold the cable 10, especially during mounting or demounting of the device.

Due to the embodiment of the receiving member 1 as a flat plate that can be rotated about 360° and has a cable guide portion 7 at its periphery, the cable 10 is guided directly at the surface 2' and parallel to it so that practically no bending load occurs on the pulling anchor 6 and the threaded sleeve 19. The load capacity of the threaded sleeve 19 and of the receiving member 1 can therefore be substantially improved, especially since pulling forces within the cable 10 guided in the semi-circularly shaped portion 7 are transferred with comparatively low areal pressure onto the semi-circularly formed portion 7. The plate 1 is thus essentially in an advantageous manner subjected to pressure forces. It may thus be embodied in a comparatively simple manner and can be optimized and dimensioned such that material and weight are reduced.

In order to minimize in all possible load directions the effective forces and to prevent high loads on the cable itself, especially to prevent its bending during pulling forces acting at a slant, at both end sections 7a of the cable guide portion 7 deflecting surface 11, 11' are provided at the plate 1a which deflecting surfaces 11, 11' guide the cable 10 away from the surface 2' in an upward direction toward the lifting device.

In the shown embodiments the deflecting surfaces 11, 11' which are oriented upwardly and which are positioned diametrically opposite one another are arranged at the ends of a stay 9 which is positioned diagonally to the cable guide portion 7. This stay 9 is located at the upper side of the plate 1a and is a unitary part of this plate so that the plate 1a, and thus the receiving member 1 itself, is additionally reinforced and provides for a stable massive device that is resilient to pressure. The stay 9 is furthermore embodied such that it projects past the plate 1a at the oppositely arranged end sections "7a" of the cable guide section 7 whereby the respectively projecting undersides of the stay 9 form initially parallel limiting surfaces 15, 15' that extend parallel to the surface 2' of the precast concrete component which then have a transition in the upward direction into the deflecting surfaces 11, 11'. An important feature of the present invention is that the centers of the substantially circularly shaped upwardly extending deflecting surfaces 11, 11' are displaced relative to the axis 5' of the bore 5 extending through the center of the throughbore 5 and the end sections of the cable guide portion 7 (as indicated in the drawing) such that under pulling loads, even when exerted at an angle, the additional pulling and bending forces are optimally low at the threaded sleeve 19 and the pulling anchor 6.

Due to this displacement of the deflecting surfaces and their rearward edges 16, 16' the load on the pulling anchor 6, especially pulling and bending loads, for any occurring load condition are optimally minimized in the direction of load whereby due to the rounding of the upwardly extending deflecting surfaces 11, 11' a sharp bending of the cable is prevented during the initial lifting movement. Expediently, the edges 16, 16' of the deflecting surfaces 11, 11' extend parallel to the diameter 7' which delimits the semi-circle of the cable guide portion 7.

In the embodiment according to FIGS. 5 to 8 a tunnel-shaped recess 17 is provided at the plate 1a which recess 17 embodies the cable guide portion 7. This tunnel-shaped recess 17 encloses the cable 10 such that it is substantially form fittingly guided and preferably is secured such that during mounting or demounting of the device it cannot come detached from the receiving member 1.

The tunnel-shaped recess 17 is furthermore embodied such that it supports the receiving member 1, i.e., the plate 1a, on the precast concrete surface 2' when tilting movements occur. For this purpose, the tunnel-shaped recess 17 extends to the planar base surface 4 of the plate 1a and at its lower end is provided with a support surface 18. In this manner, the cable 10 is practically enclosed on its underside by the plate 1a whereby due to the special embodiment of the forward lower side of the plate in the form of a support surface 18 a favorable support action of the plate 1a on the surface 2' of the prefabricated component 2 is achieved. Due to the tunnel-shaped enclosure of the cable 10 by the recess 17, the lever action of the support force in the area of the concrete surface is advantageously increased.

Figure 5:
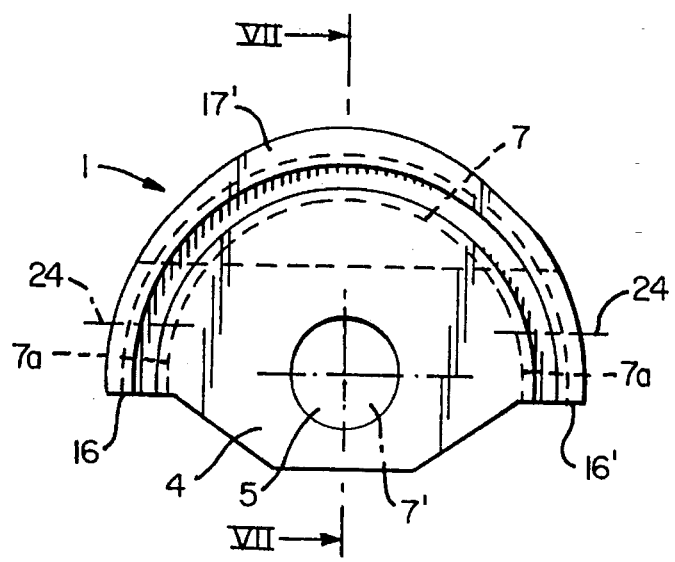
FIG. 5 shows the receiving member in the form of a plate in a view from the bottom.
Figure 7:
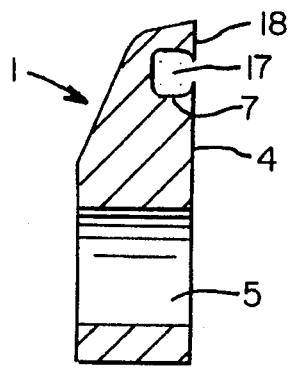
FIG. 7 shows a section along line VII—VII of FIG. 5.
Figure 6:
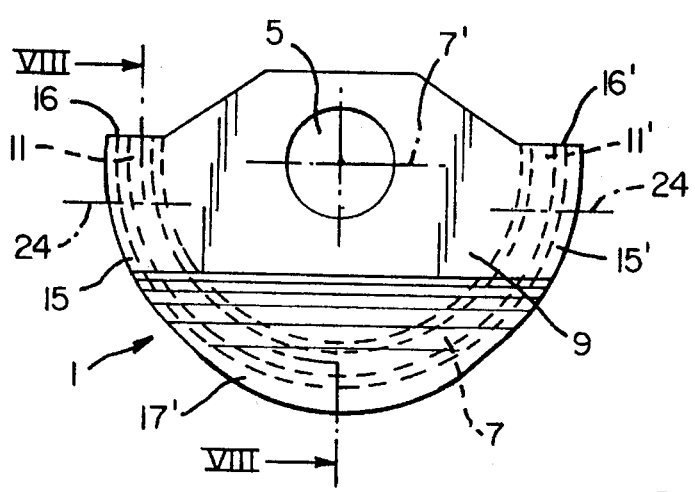
FIG. 6 shows a view from the top of the plate-shaped receiving member of FIG. 5.
Figure 8:
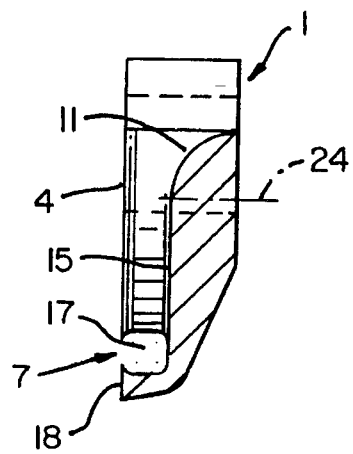
FIG. 8 shows a section along the line VIII—VIII of FIG. 6.
Figure 9:
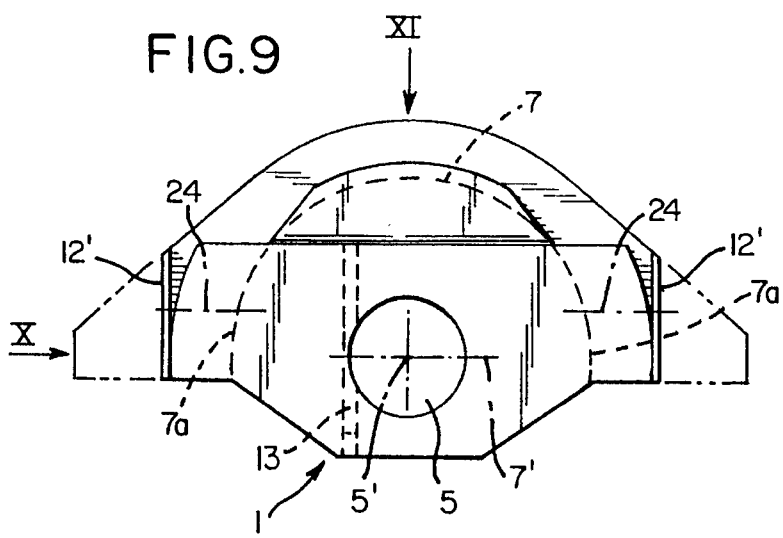
FIG. 9 shows a variation of the receiving member in the form of a plate in a plan view.
Figure 10:
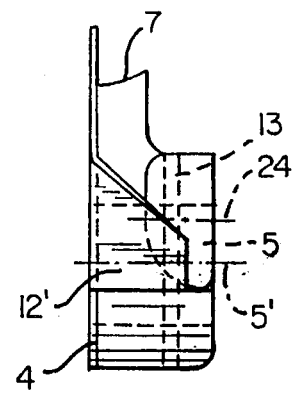
FIG. 10 shows a view in the direction of arrow X of FIG. 9.
Figure 11:
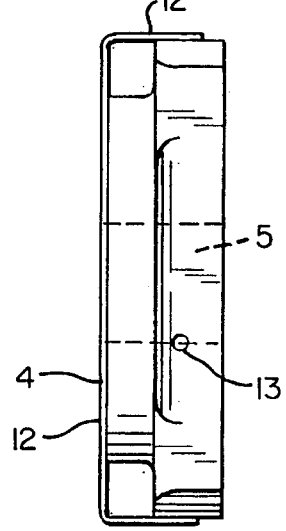
FIG. 11 shows a view in the direction of arrow XI of FIG. 9.
Figure 12A:
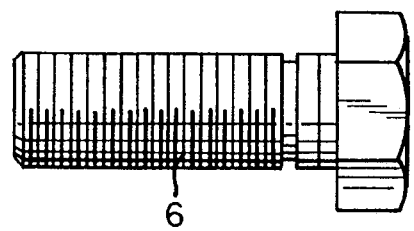
FIGS. 12a–d show various embodiments of the pulling anchor (fastener) for various loads for one and the same size of the threaded sleeve in the precast concrete component as well as embodiments of the adapters cooperating with the securing pin.
Figure 12B:
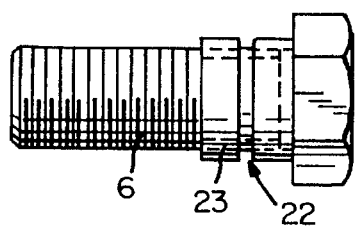
Figure 12C:
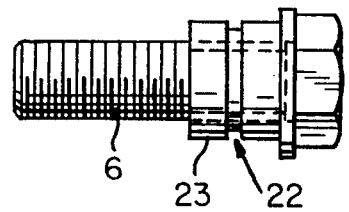
Figure 12D:
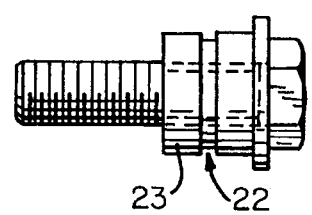

For increasing the lever action of the support force the plate 1a may also be embodied in an oval shape. In FIGS. 5 and 6 an embodiment is shown in which a forward part 17' limiting the tunnel-shaped recess 17 is provided at the plate 1a which provides an oval projection relative to the circular shape with which the actual support surface 18 is increased. The cable itself can be exchanged without problems despite the tunnel-shaped recess 17 and is connected to the device so that it cannot become detached. At the same time, it is prevented that the cable 10 could be moved from its end face position within the cable guide portion 7.

The receiving member 1, comprised of the plate 1a for guiding the cable and the stay 9, with the deflecting surfaces 11, 11', and the limiting surfaces 15, 15', can be manufactured as a unitary part, including the tunnel-shaped recess, as a cast or forged part.

The displacement of the centers 24 of the upwardly curved deflecting surfaces 11, 11' is such that it is optimal for all directions of force actions. This displacement is dependent on the diameter of the cable and the angles of action of the forces. Its optimal absolute value can be determined in a simple manner, for example, empirically. It is only important that due to this displacement, the additional pulling and bending loads of the pulling anchor 6 and the sleeve 19 are minimized in any given pulling direction. The deflection of the cable 10 by the cable guide portion 7 practically directly at the surface 2' of the prefabricated component 2 has the effect that upon transverse pulling action the plate 1a and the pulling anchor 6 are minimally loaded. When the pulling action is exerted parallel to the surface 2' of the prefabricated component 2, the effective lever action corresponds only to half of the diameter of the cable.

The receiving member 1 may have an auxiliary bore 13 extending at an angle, preferably at a right angle, to the throughbore 5. A securing pin 14 can be inserted into the auxiliary bore 13 for securing the fastener (pulling anchor) 6 by engaging the groove 22 at the adapter 23 (see FIG. 1, 12).

The present invention is, of course, in no way restricted to the specific disclosure of the specification and drawings, but also encompasses any modifications within the scope of the appended claims.

What we claim is:

1. A coupling device for coupling a cable of a lifting device to a prefabricated component having embedded therein a threaded sleeve, said coupling device comprising:

a receiving member for receiving the cable, said receiving member comprised of a solid plate;

said receiving member having a throughbore and a planar base surface with which said receiving member rests at a surface of the prefabricated component;

a fastener with an outer thread for connecting said receiving member to the threaded sleeve of the prefabricated component such that said receiving member is rotatably supported at the prefabricated component;

said fastener extending through said throughbore of said receiving member;

said plate of said receiving member having an arc-shaped cable guide portion with a first and a second end sections for guiding the cable, said cable guide portion extending along a periphery of said plate over substantially an angular distance of 180° so as to be substantially parallel to and directly adjacent to said surface of the prefabricated component; and said plate having a first and a second arc-shaped deflecting surfaces, wherein said first deflecting surface extends from said first end section of said cable guide portion upwardly away from said planar base surface and said second deflecting surface extends from said second end section of said cable guide portion upwardly away from said planar base surface.

2. A coupling device according to claim 1, wherein said throughbore extends perpendicular to said base surface through said receiving member.

3. A coupling device according to claim 2, wherein:

said plate is selected from the group consisting of a semi-circular plate and a semi-oval plate;

said cable guide portion is located such that said throughbore is centrally positioned relative to said cable guide portion.

4. A coupling device according to claim 1, wherein:

said receiving member comprises a stay positioned on a side of said plate opposite said base surface; and said deflecting surfaces are provided at free ends of said stay.

5. A coupling device according to claim 4, wherein:

said plate and said stay are a unitary part;

said stay projects upwardly past said end sections of said cable guide portion;

said free ends of said stay have an underside to which said deflecting surfaces are connected; and said underside of said free ends have limiting surfaces for securing guiding of the cable, said limiting surfaces positioned on a side of said deflecting surfaces facing said cable guide portion.

6. A coupling device according to claim 4, wherein said deflecting surfaces have a center that is displaced toward said cable guide portion relative to a line extending through the center of said throughbore and said end sections of said cable guide portion.

7. A coupling device according to claim 6, wherein said arc-shaped cable guide portion describes a semi-circle and said deflecting surfaces have edges extending parallel to a line extending between end points of said semi-circle.

8. A coupling device according to claim 1, wherein said cable Guide portion is a tunnel-shaped recess of said plate, wherein said recess is dimensioned so as to enclose the cable without play.

9. A coupling device according to claim 8, wherein said tunnel-shaped recess extends to said base surface and ends in a support surface extending in a same plane as said base surface.

10. A coupling device according to claim 8, further comprising a thin-walled cover plate connected to said plate so as to be positioned between said base surface and said surface of the prefabricated component.

11. A coupling device according to claim 1, wherein said receiving member has an auxiliary bore positioned at an angle to said throughbore for receiving a securing pin.

12. A coupling device according to claim 11, wherein said fastener comprises at least one adapter for adapting the diameter of said fastener to the diameter of said threaded sleeve, said adapter having an annular recess for receiving said securing pin.

13. A coupling device according to claim 12, wherein one said threaded sleeve is used in combination with a plurality of said fasteners each having a different diameter, and wherein said fasteners are adapted to said threaded sleeve with said adapters.

* * * * *